United States Patent [19]
Tranvoiz

[11] Patent Number: 5,440,950
[45] Date of Patent: Aug. 15, 1995

[54] DEVICE FOR QUICK MOUNTING AND REMOVAL OF A SHAFT, SUCH AS A PEDAL SHAFT

[76] Inventor: Renë Tranvoiz, 20 bis, rue Sophie-Rodrigue, 92500 Rueil-Malmaison, France

[21] Appl. No.: 104,036
[22] PCT Filed: Dec. 9, 1992
[86] PCT No.: PCT/FR92/01164
§ 371 Date: Oct. 5, 1993
§ 102(e) Date: Oct. 5, 1993
[87] PCT Pub. No.: WO93/11990
PCT Pub. Date: Jun. 24, 1993

[30] Foreign Application Priority Data
Dec. 9, 1991 [FR] France .................. 91 15204

[51] Int. Cl.⁶ ............................. G05G 1/14
[52] U.S. Cl. ..................... 74/594.4; 74/594.1
[58] Field of Search ............... 74/594.1, 594.4; 403/92, 325

[56] References Cited
U.S. PATENT DOCUMENTS

| | | | |
|---|---|---|---|
| 3,908,943 | 9/1975 | Bannister | 403/92 X |
| 4,778,487 | 10/1988 | Chenel | 403/325 |
| 4,873,890 | 10/1989 | Nagano | 74/594.4 |
| 5,315,896 | 5/1994 | Stringer | 74/594.4 |

Primary Examiner—Charles A. Marmor
Assistant Examiner—Peter Kwon
Attorney, Agent, or Firm—Sughrue, Mion, Zinn, Macpeak & Seas

[57] ABSTRACT

A device for rapid mounting and removal of a bicycle pedal shaft on a lever or crank arm 4. The pedal assembly comprises a shaft 1 provided with a smooth bearing 5 in the longitudinal direction received in a correspondingly shaped recess at the end of the crank arm or lever, enabling the shaft to be quickly and easily engaged in a removable manner. A retractable retainer 12-14 is provided between the shaft and a threaded ring 2 screwed into the recess in the crank arm or lever.

10 Claims, 6 Drawing Sheets

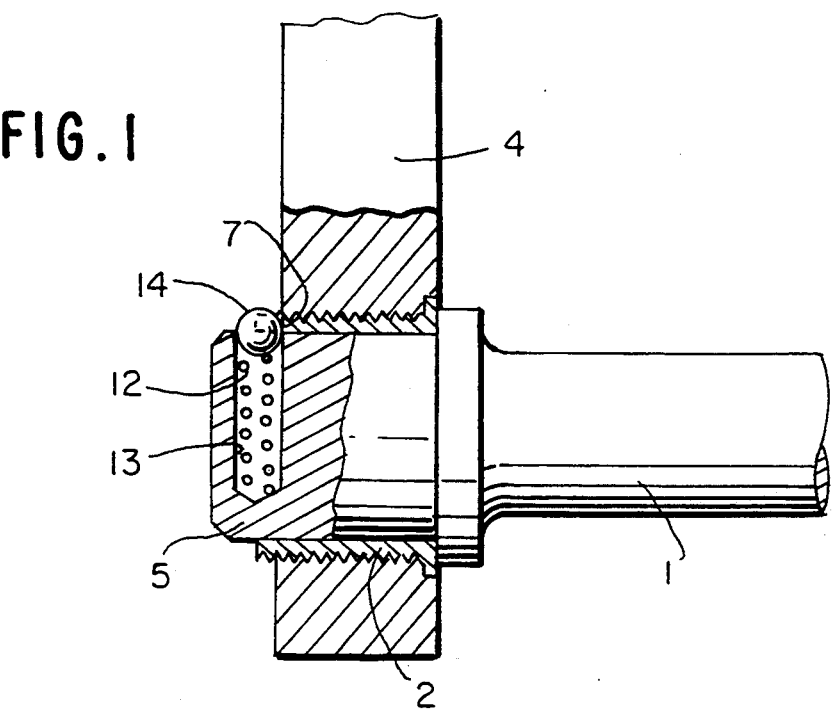
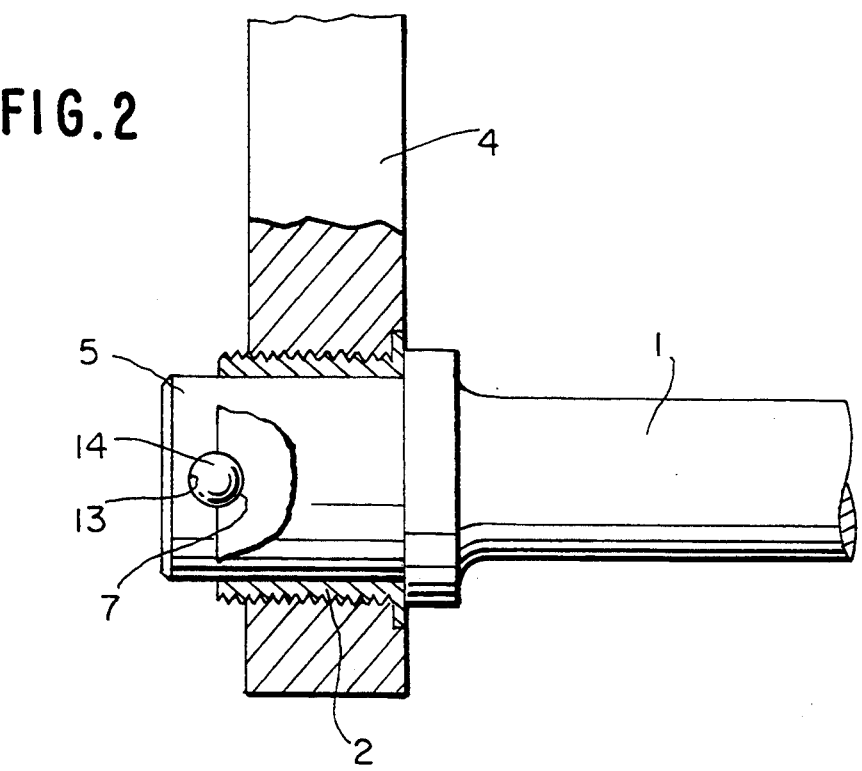

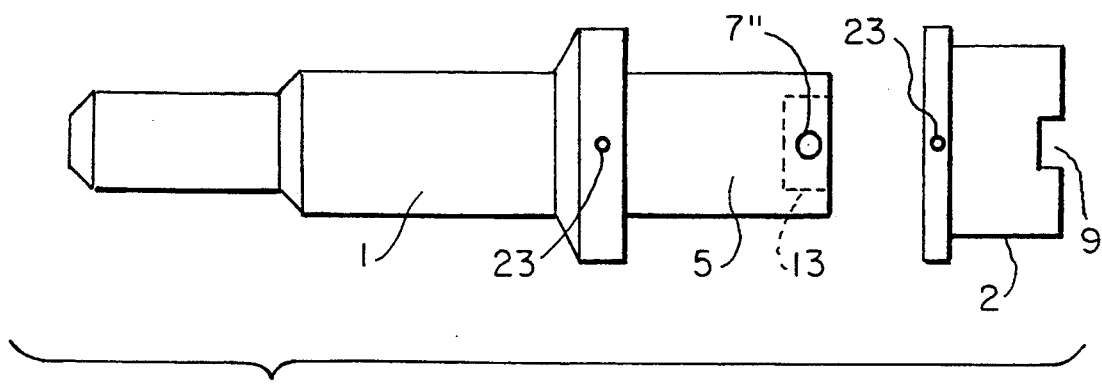
FIG. 14A
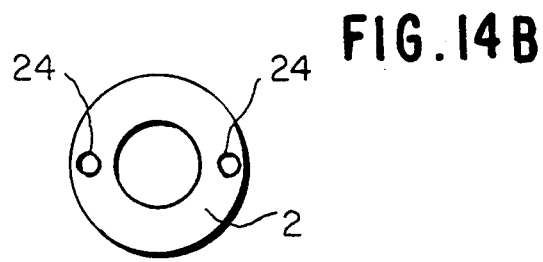
FIG. 14B
FIG. 15
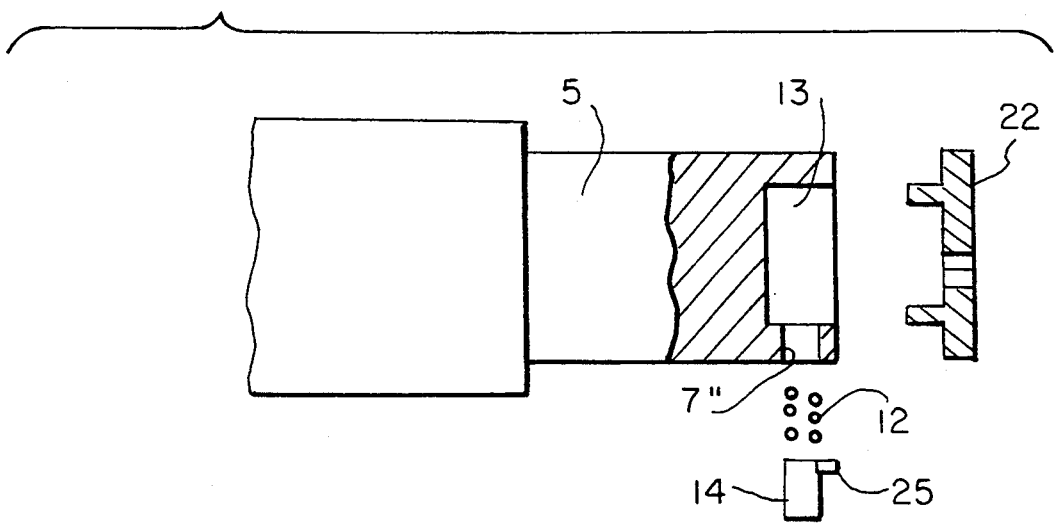

DEVICE FOR QUICK MOUNTING AND REMOVAL OF A SHAFT, SUCH AS A PEDAL SHAFT

BACKGROUND OF THE INVENTION

An object of the present invention is to provide a shaft, such as a pedal shaft, which can be quickly mounted on or removed from a lever or a crank arm, of a bicycle for example.

Pedal shafts are currently manufactured with a left-hand thread for the left pedal and a right hand thread for the right pedal, so that a tool is required to clamp the pedals on their cranks: this is a lengthy and tedious operation; moreover, the pedals are an extra encumbrance in the transport, storage and stacking particularly of bicycles or other moving objects equipped with pedals; hence the advantage of being able to remove said pedals quickly without a special tool and with minimum effort.

SUMMARY OF THE INVENTION

According to a first feature, the invention provides a device for mounting a shaft, such as a pedal shaft, on a lever or crank arm, the invention being characterized in that it comprises: a shaft provided with a journal bearing intended to be received by sliding longitudinally in a recess of corresponding shape arranged at the end of the crank arm or lever, so as to allow quick fitting and easy removal of said shaft, there being provided between said part and the part comprising the corresponding recess in the crank arm or lever releasable means for retaining in the fitted position.

According to other features, the recess of corresponding shape provided at the end of the crank arm is formed by a ring with an external right- or left-hand thread, intended to be received in the right- or left-hand threaded hole of an existing crank arm.

The clamping or locking means comprises on the pedal shaft a retaining element such as a ball or stop mounted on a spring or an elastomer block which is itself positioned on the bearing of the shaft in a bore perpendicular to said shaft, the retaining element such as a ball or stop either fitting in a cavity, a hole or a cut-out provided for that purpose in the female part of the crank arm, or laterally and external to said crank or said ring; so that in order to release the shaft, it is sufficient to manually push away the ball or stop so that the shaft may be disengaged from the ring provided on the crank.

According to another embodiment, the clamping means is constituted by a spiral spring which is positioned over the external threads of the ring whose breadth is greater than that of the bore in the arm, the spiral of said spring being prolonged by a curved loop intended to be inserted in a groove provided on the shaft beyond the end of the ring. To ensure the shaft is held without any play, the shoulder of the shaft is pressed against an 0-ring situated between said shoulder and the shoulder of the ring.

According to another embodiment, two diametrically-opposed windows are provided on the ring to receive a fastener for holding the shaft which is provided with an opposed groove on its bearing. In this case, and according to another particular feature, the shaft may be held without play by, for example, a spring or an O-ring bearing against a washer, the latter itself bearing against the retaining fastener, said elements possibly being integral with the ring to avoid their loss; alternatively, said resilient elements may equally well be situated between the shoulder of the shaft and the shoulder of the ring.

According to another embodiment, the releasable means for retaining the shaft in the fitted position which are interposed between the shaft and the part of the recess in the crank arm on the side away from the pedal, are constituted by: firstly, at the end of said portion of the pedal shaft at a distance at least equal to the length of the recess or the ring of the crank arm, a bearing of reduced diameter comprising firstly, a channel pierced by two diametrically opposed holes or one through hole, the bearing being prolonged in a shoulder of diameter slightly greater than that of the bottom of the channel and less than the diameter of the bearing of said shaft, and secondly, with a fastener mounted so as to pivot between a retaining position perpendicular to said shaft and a position away from the shaft in which it is disposed axially relative to said shaft so as to be disengaged through the slot without the need for the fastener and the shaft to be separated, said fastener being provided with two spaced parallel arms whose ends are bent back to face one another and can be inserted in the or each hole provided diametrically at the bottom of the channel of the shaft, the difference in diameter between the smooth portion of the shaft and the outside diameter of the farthest shoulder being at least equal to the combined thickness of the two arms of the fastener. The latter may take the form of a resilient wire folded in a U with a further fold at the end of each of the arms of the U-shaped fastener so that the ends are facing. Viewed from the side at the position of the arms and relative to the plane of the arms, the fastener may present a set-back portion defining successive segments which are arranged in parallel and which are connected to one another at the set-back by a portion which is inclined so as to separate the end of the fastener at its end portion forming the U, from the crank arm so as to facilitate operating and gripping; the length of the journal bearing of the shaft being equal to the length of the recess so that, combined with positioning of the fastener immediately after the journal bearing, the ends between the set-back portion and the bent-back parts of the arms bear against the opposed portion of the crank pedal, the breadth of the channel corresponding to the thickness of the arms and the depth of the channel corresponding approximately to half the thickness of the wire of the fastener so as to allow: firstly, the fastener to be held perpendicular to the plane of the channel in the retained position; and secondly, the two ends of the arms of the fastener to pivot by 90° about the axis defined by the bore in the channel, in a plane corresponding to the pedal shaft.

According to a first embodiment, the bearing of the shaft and the female part which receives it are provided with means for retaining them in rotation such as ribs which allow quick fitting without play in the female part of the crank or in the ring disposed in the latter.

In variants: the shaft and the corresponding bearing are polygonal in section, for example, or square or oval in section, where the major axis is preferably arranged perpendicularly to the pedal shafts. These shapes constitute variants on the basic shape of the bearing which is envisaged as cylindrical.

The accompanying drawings are given purely by way of non-limiting example to allow the invention to be better understood and show particular embodiments.

BRIEF DESCRIPTION OF THE DRAWINGS

FIG. 1 shows a detent type shaft and crank arm.

FIG. 2 shows a top view of the detent type shaft.

FIG. 14A and 14B show an expanded view of a pin and spring type retaining shaft.

FIG. 15 shows an assembly of the pin and spring type retaining shaft.

DETAILED DESCRIPTION OF THE PREFERRED EMBODIMENTS

Figure 3:
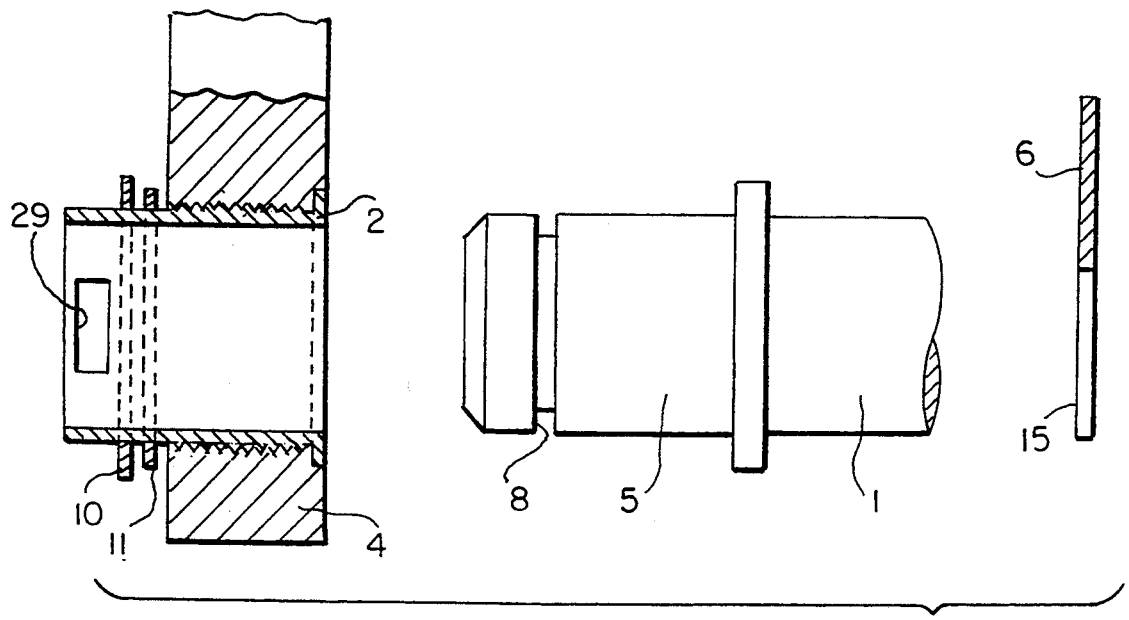
FIG. 3 shows an exploded section view of a window type retaining shaft.

FIGS. 1 and 2 show a shaft (1) mounted on a crank arm (4) via a ring (2). The bearing (5) of the shaft (1) comprises a blind hole (13), a spring (12) and a retaining ball or stop (14) which are positioned in line in a slot (7) for retaining them in rotation, the slot being provided on the outside of the ring (2) away from the pedal.

FIG. 3 shows an exploded section view of an assembly comprising a ring (2) provided with windows (29), and in section a fastener (6) for retaining he shaft (1), a washer (10) and an O-ring or spring (11) and the bearing (5) with the groove (8) of the shaft (1).

Figure 4:
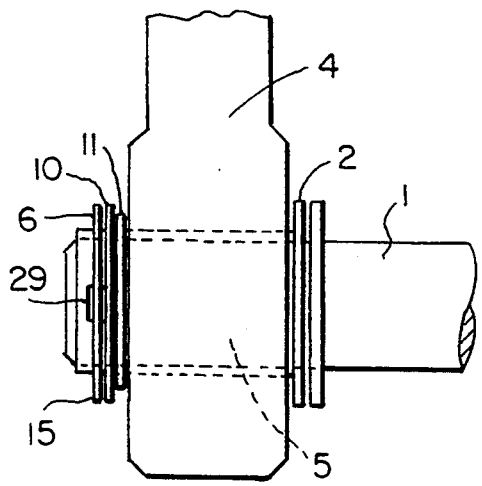
FIG. 4 shows an assembly of the window type retaining shaft.

FIG. 4 shows the assembly of FIG. 3 mounted with the arm (4), the shaft (1) and its bearing (5) received in the ribbed ring (2), the two opposed windows (29) of which ensure that the forks (15) of the fastener (6) bear resiliently through said windows (29) in the groove (8) of the shaft (1). The washer (10) and the O-ring or spring (11) ensure compensation for any lateral play resulting from the shaft bearing against the fastener (6).

Figure 5:
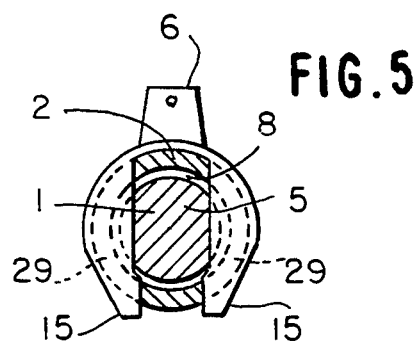
FIG. 5 shows a side view of a fastener with fork type retaining shaft.

FIG. 5 shows from the side the fastener (6) with its forks (15), which form a spring, inserted in the groove (8) of the shaft (1) through the windows (29) provided for passage of the fastener (6), these windows being provided on the ring (2) which is screwed onto the arm (4) as shown in axial section in FIG. (6).

Figure 7:
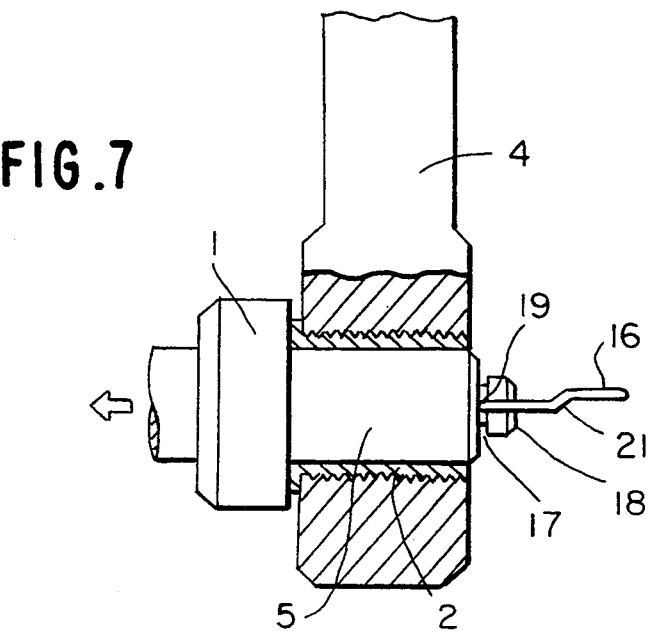
FIG. 7 shows the fastener type retaining shaft (opened).

FIG. 7 shows a shaft (1) mounted on a crank arm (4) via a threaded ring (2), the bearing (5) of the shaft being extended by a portion (18) of smaller cross-section provided with a retaining groove (17) and a hole (19) for holding a fastener (16), shown here in the open position in which the shaft can be released through the ring (2), the fastener (16) being provided with a set-back portion (21).

Figure 8:
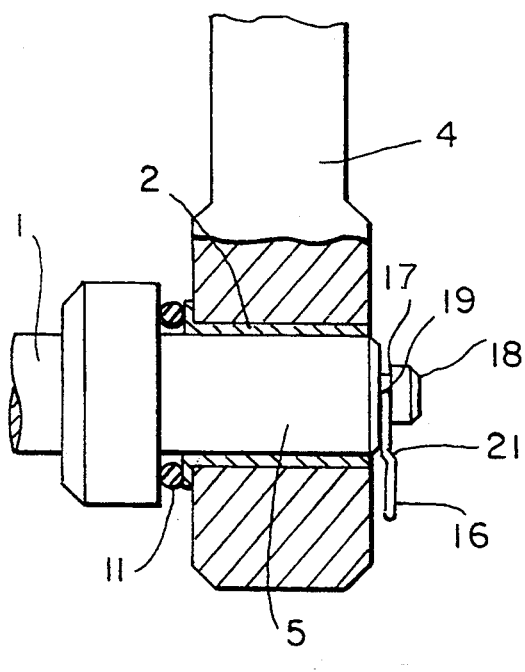
FIG. 8 shows the fastener type retaining shaft (closed).
Figure 9:
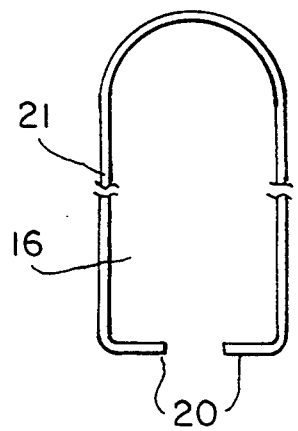
FIG. 9 shows a detail of the fastener lever.

FIG. 8 shows, in a similar fashion to FIG. 7, the shaft (1) mounted on the crank arm (4) via the smooth ring (2) integral with the arm (4) using the fastener (16) which is turned down at 90°, manipulation of the fastener (16) being facilitated by the set-back portion (21). The O-ring (11) interposed between the shoulder of the shaft (1) and the opposed clamping and bearing shoulder of the ring compensates for any play, maintains the fastener pressed against the ring and provides sealing.

FIG. 7 shows an enlarged detail from above of the fastener (16), the ends (20) of whose arms are bent back so as to be received and held in the holes of the channel (17), these arms being provided along their length with set-back portions (21).

Figure 10:
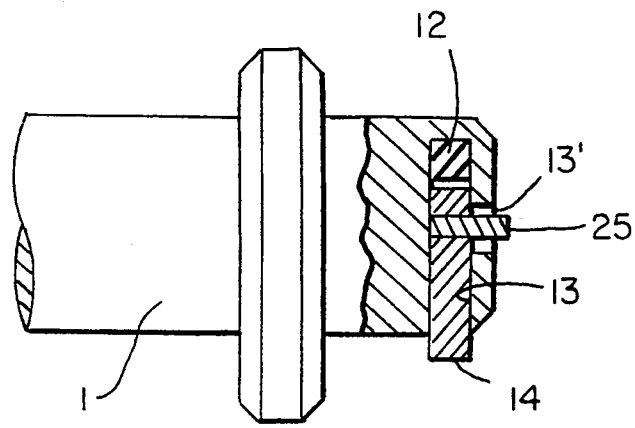
FIG. 10 shows an assembly of a push pin type retaining shaft.

FIG. 10 shows a shaft (1) provided at the end of its smooth portion with a transverse blind bore (13) intercepted by a longitudinal bore (13'), and a spring or elastomer block (12) placed at the bottom of the bore (13) to act against a stop (14) actuated through the bore (13') by an operating pin (25) which is integral with and perpendicular to the stop.

Figure 11:
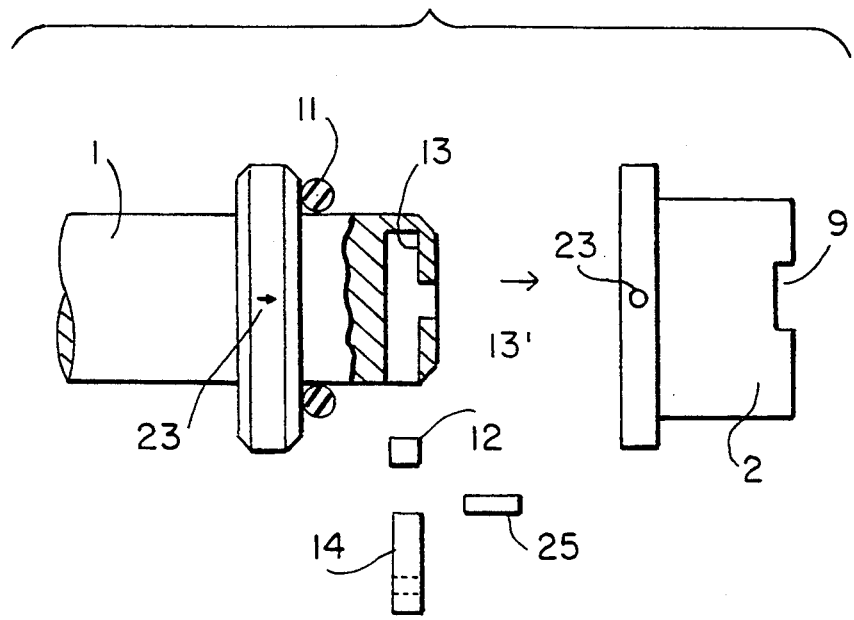
FIG. 11 shows an expanded view of the push pin type retaining shaft.

FIG. 11 is an expanded view of the shaft (1) which is provided adjacent its shoulder with an O-ring (11), and in which are perpendicular blind bores (13) and (13'), the spring (12), the stop (14) and its pin (25) forming a kind of bolt, the ring (2) which is provided with a tongue-and-groove joint (9) at its end to receive and protect the stop (14) which locates there so as to avoid all relative movement, indexing means (23) being provided if desired on the shoulders of the shaft (1) and the ring (2) to facilitate location of the stop (14) in the joint (9) when these are placed together.

Figure 12A:
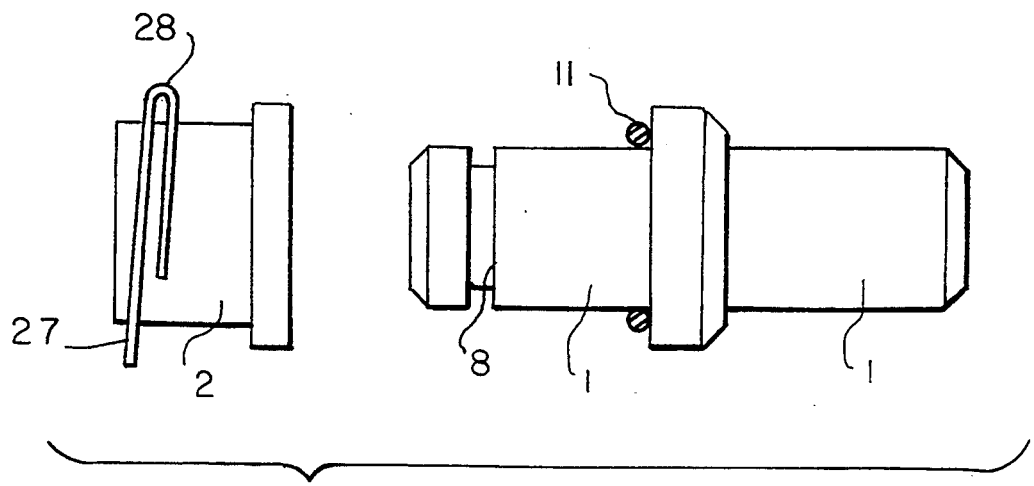
FIG. 12A and 12B show an expanded view of a spring type retaining shaft.
Figure 12B:
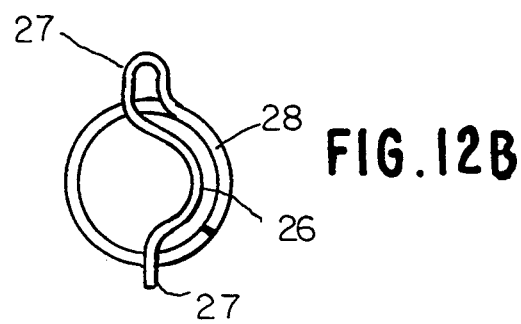

FIGS. 12A and 12B show a shaft (1) with a groove (8) and an O-ring (11), an externally-threaded ring (2) on which is positioned a spring (28) formed from a rolled-up spiral of the same diameter as the thread on the ring, the spiral being extended as a loop (27) provided at its midpoint with a concave portion (26) which locates in the groove (8) of the shaft (1).

Figure 13:
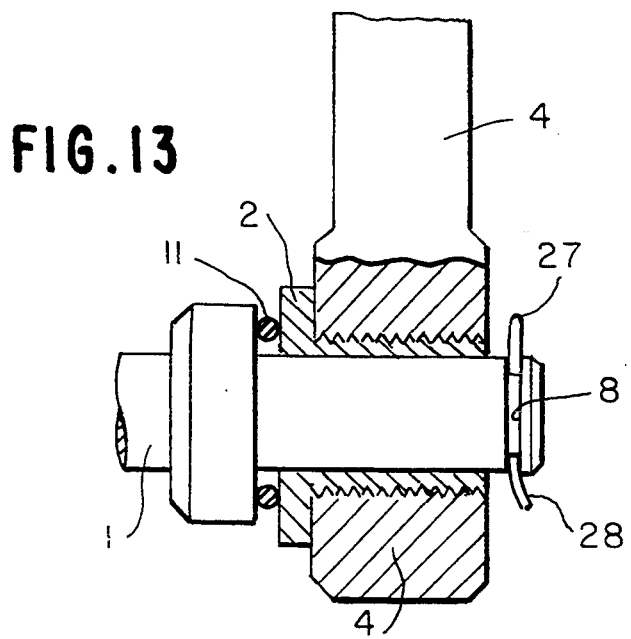
FIG. 13 shows an assembly of the spring type retaining shaft.

FIG. 13 shows the assembly of FIG. 13 when mounted: the shaft (1) positioned in the ring (2) on the crank (4), the loop (27) of the spring (28) positioned in the groove (8) of the shaft (1) holding said shaft by compressing the O-ring (11) positioned between the shoulders of the shaft and the stop.

FIGS. 14A, 14B and 15 show respectively a shaft (1) whose bearing (5) is provided at one end with an axial blind hole (13) which is intersected laterally by a bore (7"), and a ring (2) provided at its end with a lateral tongue-and-groove joint or cut-out (9) into which a stop (14) with an operating pin (25) is inserted under the action of a spring or elastomer block (12), located in the recess (13) and held by a cover (22). The recess in the ring (2) is provided with two blind holes (24), arranged parallel to the axis of the ring (2), to receive the pins of a locking key so as to ensure that said ring is clamped onto the arm (4); if necessary, clamping may be completed by gluing.

With reference to these drawings, one non-limiting object of the invention is to provide a device for mounting a pedal shaft (1) provided with a journal bearing (5) which is ribbed or of a form allowing it to be quickly mounted in the longitudinal direction, so as to be received in a correspondingly-shaped recess arranged at the end of the crank arm (4), allowing quick fitting and easy removal from said shaft (1), releasable means for retaining in the fitted position being provided between said bearing (5) and a portion of the corresponding recess (3) in the crank arm (4) or a ring (2) arranged in the crank arm.

The device for holding the shaft (1) in the arm (4) or the ring (2) of the crank arm may be constituted according to FIGS. 1, 10 and 11 by a blind hole (13) arranged perpendicularly to the shaft (1), the hole receiving a retaining element such as a ball or a stop (14) mounted on a spring or an elastomer block (12) and intended to be inserted in a hole (7) or a tongue-and-groove joint (9) provided for that purpose in the ring (2) or in the crank arm (4), a pin (25) allowing the stop to be compressed to release the shaft. In the case shown in FIG. 3, where the ball (14) bears against the inside of the bearing, a compression element (7') may be provided in the hole (7'') which defines the end of the ball cavity.

According to another embodiment, the stop (14) which bears against a spring or elastomer block (12) is actuated by a pin (25) positioned in a hole (13'), the diameter of which allows said pin to be displaced to compress said spring or elastomer block (12) to allow said stop to be disengaged from the ring (2) so as to unlock the shaft (1).

Figure 6:
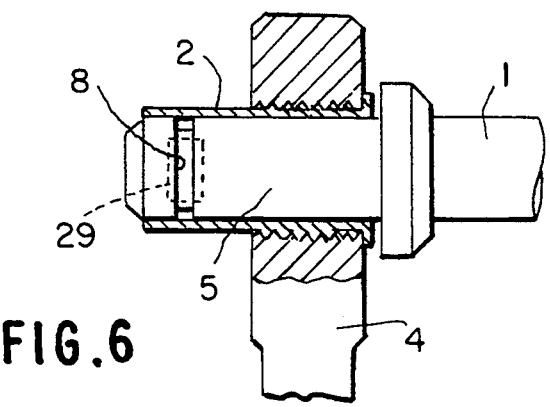
FIG. 6 shows a front view of the fastener with fork type retaining shaft.

According to the variant illustrated in FIGS. 5 and 6 the quick clamping means for the shaft (1) may advantageously be constituted by a groove (8) on the bearing (5) of the shaft (1), the groove (8) being provided to receive externally to the ring (2) a spiral (27) of a spring or the forks (15) of a holding fastener (6), either externally or via windows (29) provided on the ring (2), an O-ring (11) ensuring that any resulting lateral play is compensated.

According to the variant illustrated in FIGS. 7 and 8 the quick clamping means for the shaft may advantageously be constituted by a groove (17) provided between the bearing (5) of the shaft (1) and a bearing (18) of diameter reduced relative to that of the bearing (5) by the thickness of a pivoting fastener (16), the bearing (18) being provided with two holes (19) for holding the bent-back ends (20) of the arms (21) of said fastener. When positioned in the groove(17), the fastener maintains the shoulder of the bearing (5) pressed against the bearing shoulder of the ring (2). To release the shaft from the ring, the fastener (16) is pivoted through 90° to assume the horizontal position in which it can pass through the ring (2) whilst remaining on the bearing (18).

According to the variant illustrated in FIGS. 14 and 15, the bearing (5) of the shaft is provided with a blind hole (13) for receiving a stop (14) with its pin (25) and a spring or elastomer block (12), the ring (2) is provided with a cut-out (9) such that the upper portion of the stop (14) is maintained in a protruding position by the spring or elastomer block (12), to hold the shaft through the tongue-and-groove joint (9) of the ring (2). To release the shaft, it suffices to apply pressure to the pin (25) which in turn releases the stop (14) from the cut-out (9). A cover (22) is provided to protect and hold the stop and its spring in the recess (13). An index or mark (24) is provided on the shaft (1) and on the ring (2) at their shoulders to facilitate their relative positioning.

I claim:

1. A device for the quick mounting and removal of a pedal on and from a standard crank arm (4) of a bicycle, comprising: a cylindrical threaded recess of circular section defined in an end of the crank arm, said pedal comprising a shaft (1) provided with a substantially cylindrical bearing (5) and an externally threaded ring (2) screwed into the threaded recess of the crank arm, said pedal bearing being received by longitudinal sliding engagement within the ring, the ring and the pedal-shaft comprising manually operable releasable means (7, 12, 13, 14) for retaining the pedal in an engaged position.

2. A device according to claim 1, wherein the releasable means comprises a retaining ball (14) mounted on a spring (12) disposed in a bore (13) perpendicular to the bearing, the retaining ball fitting in a cut-out (7) in an edge of the ring (2); so that in order to release the shaft (1), it is sufficient to push away the ball (14) so that the shaft (1) may be released.

3. A device according to claim 1, characterized in that the clamping means is constituted by a spiral spring (28) which is positioned over the external threads of the ring (2) whose breadth is greater than that of the bore in the arm, and in that the spiral (27) of said spring (28) is prolonged by a curved loop (26) intended to be inserted in a groove (8) provided on the shaft (1) beyond the end of the ring to ensure the shaft is held under pressure and without any play.

4. A device according to claim 1, characterized in that the threaded ring (2) which is adaptable to an existing arm, comprises a portion which protrudes from the arm (4) and in which two diametrically opposed windows (29) are provided which allow the two forks of a fastener (6) for holding the shaft (1) to pass through and be clamped onto the ring, the bearing (5) of the shaft being provided with a groove (8).

5. A device according to claim 1, characterized in that the releasable means for retaining the shaft in the fitted position which are interposed between the portion of the recess in, the crank arm on a side away from the pedal, are constituted by: firstly, at the end of said portion of the pedal shaft at a distance at least equal to the length of the recess in the crank arm, a channel (17) which is prolonged in a shoulder (18) of diameter less than a diameter of the bearing (5) of the shaft (1), and secondly, with a fastener (16) mounted so as to pivot between a retaining position perpendicular to said shaft and a position away from the shaft in which it is disposed axially relative to said shaft so as to be disengaged through the slot without the need for the fastener (16) and the shaft (1) to be separated, said fastener being provided with two arms having ends (20) bent back to face one another and which can be inserted in a hole (19) provided diametrically at the bottom of the channel of a shaft, the difference in diameter between the smooth portion and the outside diameter of the farthest shoulder being at least equal to the combined thickness of the two arms of the fastener (16).

6. A device according to claim 5, characterized in that the fastener (16) is a resilient wire folded in a U with a further fold (20) at the end of each of the arms of the U-shaped fastener so that the ends are facing; the length of the journal bearing of the shaft being equal to the length of the recess so that, combined with positioning of the fastener immediately after the journal bearing (5), the ends of the arms of the fastener (16) bear against the opposed portion of the crank pedal, a breadth of the channel (17) corresponding to the thickness of the arms and the depth of the channel corresponding approximately to half the thickness of the wire of the fastener so as to allow:

firstly, the fastener to be held perpendicular to the plane of the channel in the retained position; and secondly, pivoting by 90° in a plane corresponding to the pedal shaft, about an axis defined by the bore and the two ends of the arms of the fastener.

7. A device according to claim 5, characterized in that, the arms of the U-shaped fastener present a set-back portion defining successive segments which are arranged in parallel and connected to one another at the set-back by a portion inclined so as to separate the end of the fastener at the base of the U, from the crank arm so as to facilitate operating.

8. A device according to claims 3, 4 or 5, characterized in that the shaft (1) is held without play by a resilient member (11) interposed between the shoulders of the shaft and of the ring.

9. A device according to claim 1, a characterized in that the bearing (5) of the shaft (1) and a female part which receives them are provided with ribs for retaining them in rotation which allow quick fitting without play in the female part of the crank, (4) said ribs being polygonal in section.

10. A device according to claim 3, characterized in that the cut-out (7) is defined by a drilling (7″) which opens onto the exterior of the arm (4) and in which a sliding member (7′) is provided to push away the ball (14).

* * * * *